March 25, 1930.  L. S. HETH  1,751,696
HYDRAULIC SHOCK DIFFUSER
Filed May 4, 1928   2 Sheets-Sheet 1
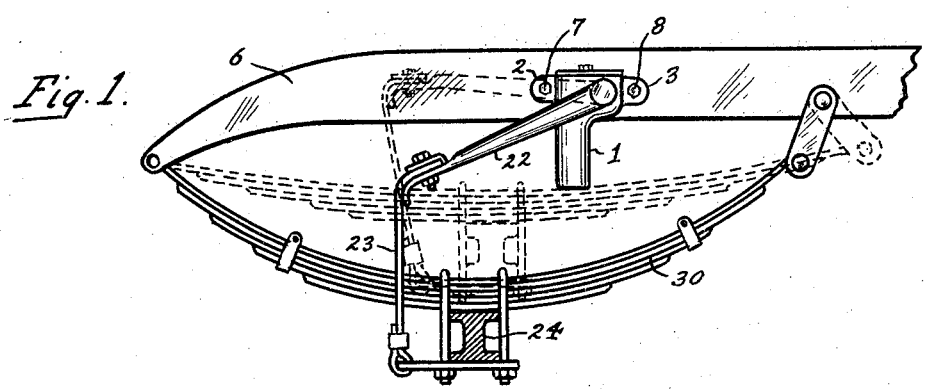
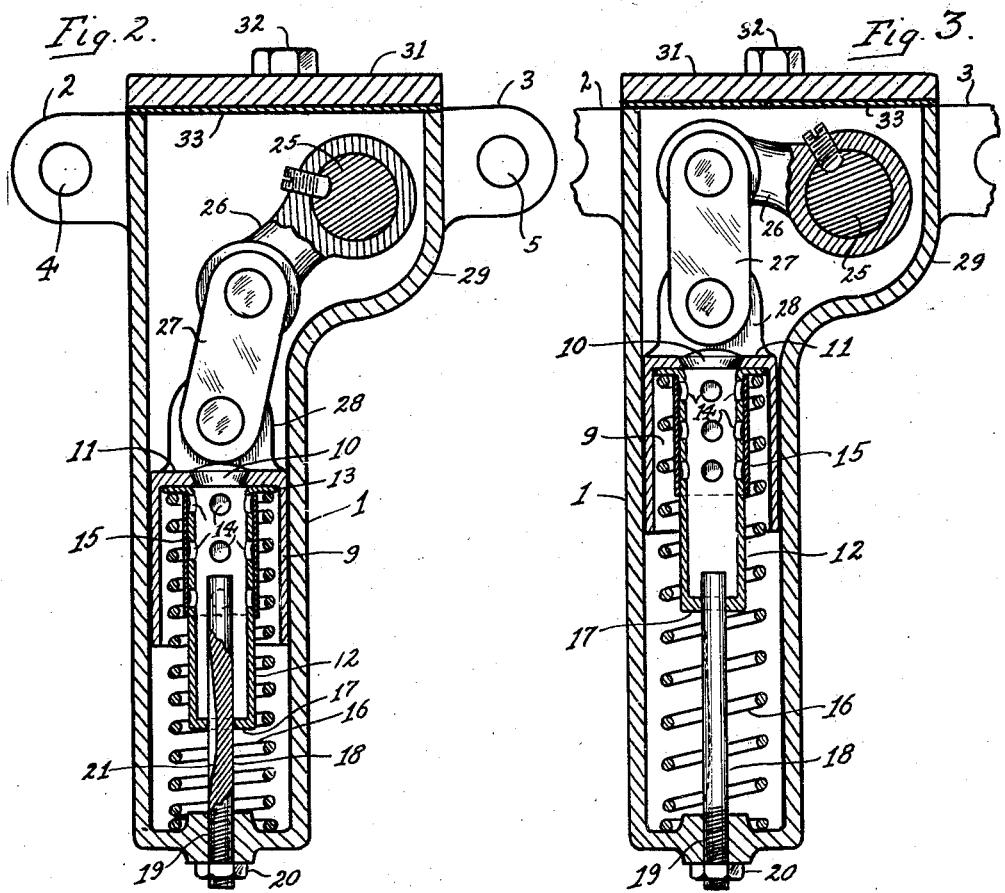
INVENTOR
Leon S. Heth.
BY Cyrus W. Rice
ATTORNEY
Witness:

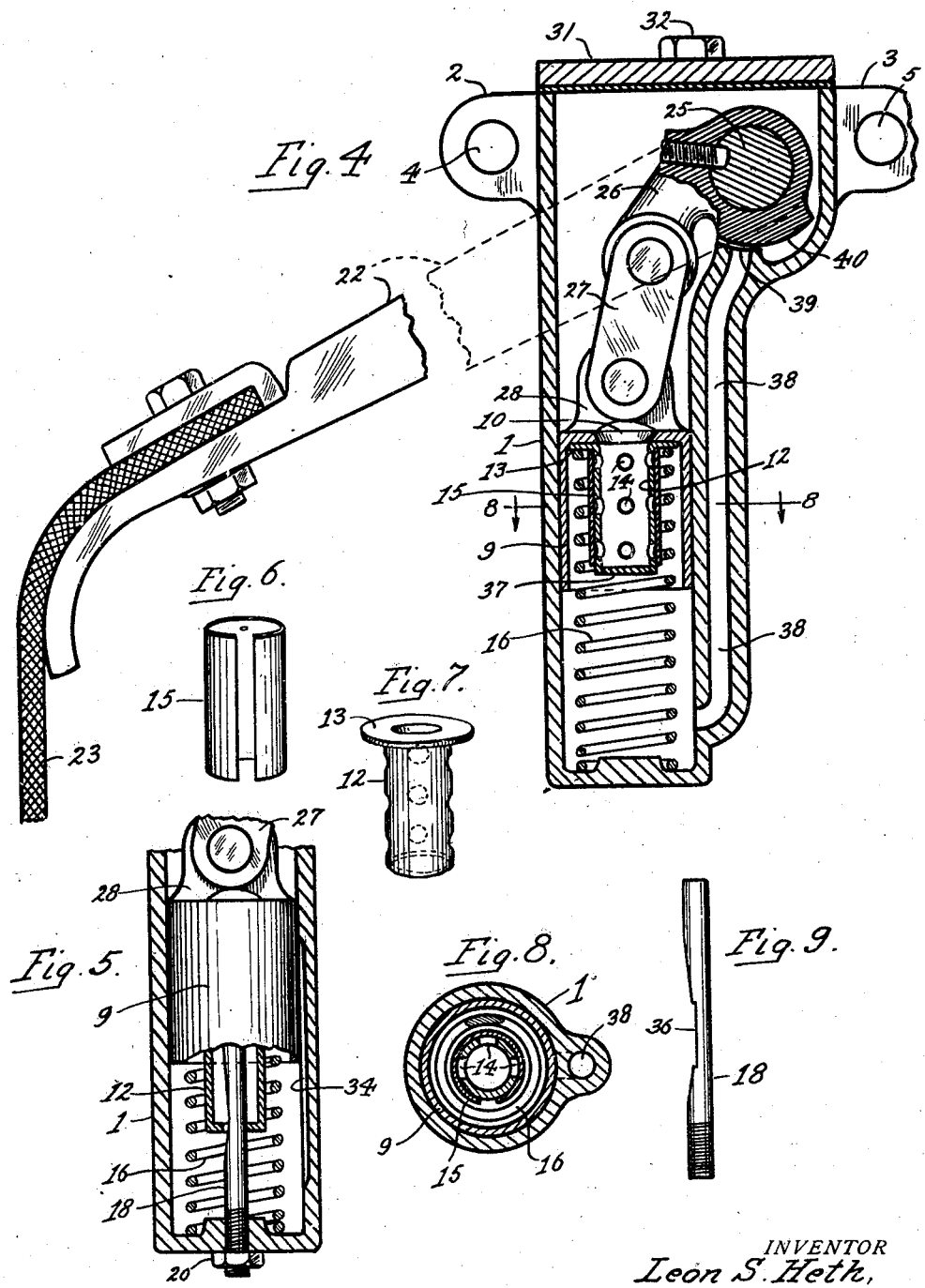

Patented Mar. 25, 1930

1,751,696

UNITED STATES PATENT OFFICE

LEON S. HETH, OF EAST GRAND RAPIDS, MICHIGAN

HYDRAULIC SHOCK DIFFUSER

Application filed May 4, 1928. Serial No. 275,011.

This invention relates to shock absorbers or diffusers of the hydraulic type particularly suitable for automobiles, airplane landing gear, and the like.

The main objects of this invention are to provide an improved form of hydraulic shock diffuser that will have a variable checking action which is proportionate to the amount of spring action to be checked; to provide a hydraulic shock diffuser in which the rate of flow of the liquid during its checking action will be varied in proportion to the power of the action being checked thereby; and to provide a shock diffuser of this type which is simple in construction, of relatively few parts and scientifically correct in design.

An illustrative embodiment of this invention is shown in the accompanying drawings, in which:

Fig. 1 is a view in elevation of the improved shock absorber attached to the front end of an automobile chassis frame, spring, and axle.

Fig. 2 is an enlarged vertical medial sectional view of the improved shock absorber mechanism in its normal operating position.

Fig. 3 is a view similar to Fig. 2 but with the parts shown in the position they assume when the axle is moved upwardly toward the chassis frame as shown in dotted outline in Fig. 1.

Fig. 4 is a medial vertical sectional view of a modified form of my improved hydraulic shock absorber.

Fig. 5 is a fragmentary vertical medial section of another modified form.

Fig. 6 is a view in perspective of the resilient sleeve which forms a valve.

Fig. 7 is a view in perspective of the modified form of valve tube which cooperates with the resilient sleeve shown in Fig. 6.

Fig. 8 is a sectional view taken on line 8—8 of Fig. 4.

Fig. 9 is a view in elevation of another modified form of plunger rod for controlling the restricted flow of the liquid.

In the construction shown in the drawings, a cylindrical casing member 1 is provided with laterally extending lugs 2 and 3 integrally formed on one end thereof which have bolt holes 4 and 5 respectively therethrough. The casing is shown secured in an upright position to the chassis frame 6 by bolts 7 and 8, but may be secured in any desired position.

The cylinder 1 has a skirted piston 9 slidably mounted therein which is provided with a relatively large hole 10 in the head 11 thereof, through which liquid may freely pass from one side of the piston to the other side thereof.

A valve is provided for permitting such free passage of liquid in one direction only and comprises a tube 12 having an outwardly turned flange 13 on one end thereof for fitting against the lower face of the piston head 11 around the opening 10. The side walls of the tube 12 have a plurality of perforations 14 therethrough and a resilient split sleeve 15 surrounds the tube to normally yieldingly close said perforations.

A helical compression spring 16, having one end thereof bearing against the closed bottom of the cylinder 1 and its other end bearing against the flange 13, is provided for holding the top end of the tube 12 in sealed relation against the lower face of the piston head 11, and for urging the piston upwardly in the cylinder at all times.

The lower end of the tube 12 has an inwardly turned annular flange 17 which provides an annular passageway adapted to slidably receive an upstanding plunger rod 18. The rod 18 is rigidly mounted at its lower end, in the lower closed end of the cylinder 1 by being threaded therethrough, as shown at 19. The threaded end of the rod 18 preferably protrudes slightly below the end of the cylinder and a lock nut 20 is threaded thereon.

In the forms shown in Figs. 2 and 3, the plunger rod 18 has an axially extending groove 21 milled in the outer surface thereof for providing a restricted passageway for liquid to pass into the tube 12. The groove 21 is of graduated varying depth to vary the cross sectional area of the rod and thereby vary the size of the restricted opening, depending upon the position of the tube 12 relative to the rod 18.

Means are provided for moving the piston, tube and valve assembly relatively to the cylinder 1, and comprise an arm 22 having a strap 23 securing one end thereof to the automobile axle 24, and the other end thereof rigidly mounted on a shaft 25, journaled on the upper end of the casing 1. The shaft 25 carries a crank arm 26 rigidly secured thereto which is pivotally connected by a link 27 to an upstanding lug 28 integrally formed on the piston head 11.

The upper end of the casing 1 is enlarged, as shown at 29, so that the shaft 25 is offset with respect to the vertical axis of the cylindrical portion of the casing in order to provide room for the crank arm to operate. The top end of the casing 1 is closed by a cap 31 secured by a stud 32. A suitable gasket 33 may be placed between the cap and casing to insure a liquid tight fit.

In the operation and use of this shock absorber, the casing 1 is entirely filled with a suitable liquid such as oil and glycerine or the like. Being secured to the chassis frame and axle of an automobile in the manner shown in Fig. 1, the strap 23 is adjusted so that the piston 9 is in the position shown in Fig. 2 of the drawings, which is at about the medial point of the deepest part of the groove 21.

When the spring 30 is compressed and the axle 24 moves toward the chassis frame, as in going over a bump in the road, tension on the strap 23 is relieved and the compression spring 16 slides the piston 9 upwardly, rotating the shaft 25 through link 27 and crank arm 26, thereby raising the arm 22 to the position shown in dotted outline in Fig. 1.

When the piston is thus moved upwardly, liquid in the upper part of the casing 1 passes freely through the opening 10 and out through the perforations 14 against the yielding action of the resilient sleeve 15.

As the spring 30 between the axle and chassis frame begins its rebound, the sleeve 15 closes the perforations 14 and the liquid in that part of the cylinder below the piston is thus caused to have a return flow through the restricted passageway formed by the groove 21. The depth of this groove is graduated so as to provide a variable rate of flow, and the arrangement is such that the further the spring 30 is compressed, the smaller and more restricted will be the passageway for the return flow of the liquid.

Stated in another way, the checking action of the device will be directly proportional to the amount of force stored in the compressed spring of the automobile.

The depth of the groove 21 is so graduated that for a short distance in each direction from its normal, the checking action will be relatively little so that the spring of the automobile will have relatively free action.

With the structure and arrangement herein described, the amount of checking action, as determined by the size of the restricted passageway is entirely independent of pressure exerted upon the liquid in the cylinder, and is governed solely by positioning of the piston relatively to the grooved rod 18, as determined by the extent of relative movement between the axle and chassis frame of the vehicle.

The lower end of the groove 21 is gradually lessened in depth so that any tendency of the axle to move past normal on rebound, is also checked and, by feathering out the groove in a downward direction, this checking action will increase proportionately to the distance the axle moves past normal.

In the modification shown in Fig. 5, the inner wall of the cylindrical casing 1 is provided with a groove 34 forming a bypass for supplementing the passage of liquid from one side of the piston to the other, independently of the plunger rod 18. In this form the plunger rod 18 is also slightly modified, one side thereof being ground off as shown at 35 instead of being provided with a milled groove or slot.

In Fig. 9 is also shown another modified form of plunger rod which is provided with a notch 36 of uniform depth for the passage of the liquid during short movement in either direction from normal.

In the modification shown in Figs. 4, 7 and 8, the tube 12 is of shorter length and the lower end thereof is closed as shown at 37. Return flow of the liquid is effected through a bypass 38 which communicates at its lower end with the lower end of the cylinder 1. The upper end of the bypass 38 terminates in an upwardly facing valve seat 39 closely adjacent the shaft 25.

Flow of liquid from the bypass is variably restricted by a cam 40 integrally formed on the crank arm 26, and which is in slightly spaced relation to the valve seat 39 when the axle and chassis are in normal relation. Upward movement of the axle and consequent upward rotation of the crank arm 26 brings the cam 40 into closer relationship with the valve seat 39, the space between the cam and seat varying directly in proportion to the amount of movement of the cam.

Although but one specific embodiment of this invention has been herein shown and described, it will be understood that numerous details of the construction shown may be altered or omitted without departing from the spirit of this invention as defined by the following claims:

I claim:

1. In a device of the class described, the combination of a cylinder, a piston slidably mounted in said cylinder, a valve for passing fluid from one side of said piston to the other side thereof, said valve comprising a tube having an opening through the sidewall thereof, and a resilient sleeve surrounding said tube and adapted to yieldingly close said opening.

2. A shock absorber comprising a cylinder adapted to be secured to the chassis frame of an automobile, a piston slidably mounted in said cylinder, connections on said piston adapted to be secured to the axle of the automobile for moving said piston when said axle and chassis are moved relatively to each other, the head of said piston having an opening therethrough, a tube having perforations in the side walls thereof, a resilient sleeve surrounding said tube for yieldingly closing said perforations, means for sealing one end of said tube around said piston head opening, the other end of said tube having a relatively small opening therethrough, a plunger rod mounted on said cylinder to extend through said tube opening and have axial movement therethrough when said piston is moved in said casing, said plunger rod having a variable cross sectional area for providing a variable sized restricted passageway for the purpose set forth.

3. A shock absorber comprising a cylinder adapted to be secured to the chassis frame of an automobile, a piston slidably mounted in said cylinder, connections on said piston adapted to be secured to the axle of the automobile for moving said piston when said axle and chassis are moved relatively to each other, the head of said piston having an opening therethrough, a tube having perforations in the side walls thereof, a resilient sleeve surrounding said tube for yieldingly closing said perforations, an outwardly turned annular flange on one end of said tube, a compression spring having one end bearing against the end of said cylinder and the other end bearing against said flange and holding said flanged end sealed around said piston head opening, an inwardly turned annular flange on the other end of said tube providing a passageway, a plunger rod mounted on said casing so as to extend through said passageway and have axial movement therethrough when said plunger is moved in said cylinder, said plunger rod having different cross sectional areas at different points so as to provide variable sized restricted passageway for liquid passing into said tube through said opening in the end thereof.

In testimony whereof I have hereunto set my hand at Grand Rapids, Michigan, this 27th day of April, 1928.

LEON S. HETH.